US008022831B1

(12) United States Patent
Wood-Eyre

(10) Patent No.: US 8,022,831 B1
(45) Date of Patent: Sep. 20, 2011

(54) INTERACTIVE FATIGUE MANAGEMENT SYSTEM AND METHOD

(76) Inventor: Pamela Wood-Eyre, Clewiston, FL (US)

( * ) Notice: Subject to any disclaimer, the term of this patent is extended or adjusted under 35 U.S.C. 154(b) by 340 days.

(21) Appl. No.: 12/348,086

(22) Filed: Jan. 2, 2009

Related U.S. Application Data

(60) Provisional application No. 61/018,722, filed on Jan. 3, 2008.

(51) Int. Cl.
*G08B 23/00* (2006.01)
*B60L 3/02* (2006.01)
*B60T 7/14* (2006.01)
(52) U.S. Cl. .................... 340/575; 340/576; 180/272
(58) Field of Classification Search .................. 340/575, 340/576, 988–990, 995.19, 995.2, 995.21; 180/272; 701/200–216
See application file for complete search history.

(56) References Cited

U.S. PATENT DOCUMENTS

| 5,745,031 | A | 4/1998 | Yamamoto |
|---|---|---|---|
| 6,046,671 | A * | 4/2000 | Shimoura et al. .............. 340/439 |
| 6,225,890 | B1 * | 5/2001 | Murphy .................... 340/426.19 |
| 6,370,475 | B1 | 4/2002 | Breed et al. |
| 6,426,702 | B1 | 7/2002 | Young et al. |
| 6,559,770 | B1 | 5/2003 | Zoerb |
| 6,675,081 | B2 * | 1/2004 | Shuman et al. .................. 701/48 |
| 6,829,603 | B1 | 12/2004 | Chai et al. |
| 6,927,694 | B1 | 8/2005 | Smith et al. |
| 7,079,925 | B2 * | 7/2006 | Kubota et al. ..................... 701/1 |
| 7,301,464 | B2 * | 11/2007 | Coulter ..................... 340/573.7 |
| 7,302,327 | B2 | 11/2007 | Kudo |
| 7,308,247 | B2 | 12/2007 | Thompson et al. |
| 7,426,437 | B2 | 9/2008 | Breed et al. |
| 7,450,016 | B2 * | 11/2008 | Isaji et al. ................... 340/573.7 |
| 7,642,922 | B2 * | 1/2010 | Itou .............................. 340/576 |
| 2001/0040504 | A1 * | 11/2001 | Gehlot .......................... 340/426 |
| 2001/0047261 | A1 | 11/2001 | Kassan |
| 2002/0178005 | A1 | 11/2002 | Dusan et al. |
| 2005/0251325 | A1 * | 11/2005 | Kudo et al. ................... 701/200 |
| 2006/0089754 | A1 | 4/2006 | Mortenson |
| 2008/0291032 | A1 * | 11/2008 | Prokhorov et al. ........... 340/576 |

OTHER PUBLICATIONS

Nissan Global, http://www.nissan-global.com/EN/TECHNOLOGY/INTRODUCTION/DETAILS//RI/... [retrieved on Dec. 31, 2008].
Walbridge, Jan, Planes, Trains and Automoboiles, IBM Press Room, 2007, http://www-03.ibm.com/press/us/en/pressrelease/21942.wss, [retrieved on Dec. 31, 2008].
Drive Connected—Hughes Telematics, http://www.hugestelematics.com, [retrieved on Dec. 31, 2008].

* cited by examiner

*Primary Examiner* — Jennifer Mehmood
(74) *Attorney, Agent, or Firm* — Brian S. Steinberger; Law Office of Brian S. Steinberger, P.A.

(57) ABSTRACT

Systems and methods of detecting fatigue and drowsy conditions of vehicle drivers without initially using any disruptive visual and sound alarms, and instead immediately interacting with the driver as to their condition and providing information on rest stops through onboard GPS (global positioning satellite) systems, as well as alerting acquaintances and friends of the driver through telephones such as a cellular phone. The systems and methods can interact with the driver through touch type screens, and/or audible feedback to alert the driver of their condition and to temporarily take the driver off the roads.

17 Claims, 14 Drawing Sheets

Fig. 5

2. Set Trip Profile

Actor[s]
- Driver
- SNOOZE Control

Preconditions
- Driver has already created and selected a profile of themselves in the System (see UC#1)
- Driver is starting a new road trip and wants to set the trip parameters

Use Case Inputs
- None

200

- Three trip profiles will be pre-set in the demo
- The system will allow demo administrators to modify the trip profiles through basic text entry in a simple text file
- The Trip Profile will contain:
  - Date
  - Starting Location
  - Planned Destination
    - For purposed of demo, we should be able to select from 3 canned destinations
  - Anticipated Trip Length
    - Long w/ little stops
    - Short series of trips with frequent stops
  - Trip Function
    - System politely asks why are you going on this trip?
  - Names of Additional Passengers
    - First Name
    - Last Name
    - Preferred Name
    - Basic Information about additional passenger (if profile doesn't already exist)
    - Ability to drive in case you are tired
- At the start of the demo session, the demo administrator selects one of the three canned trip profiles in the Trip Simulator user interface
- The trip simulator will simulate elapsed time and distance between the starting location and destination selected.
- The demo administrator can "speed up time/distance" using controls in the accompanying Trip Simulator user Interface

Postconditions
- System stores the Trip Profile into memory, labeling the profile using the First and Last Names
- Trip session started with Snooze System keeping track of elapsed time and distance
- Snooze Control set to Standby

Use Case Outputs
- Activates 5. Periodically Checks Alertness when in Standby Mode 8. Use GPS to Find Nearest Location

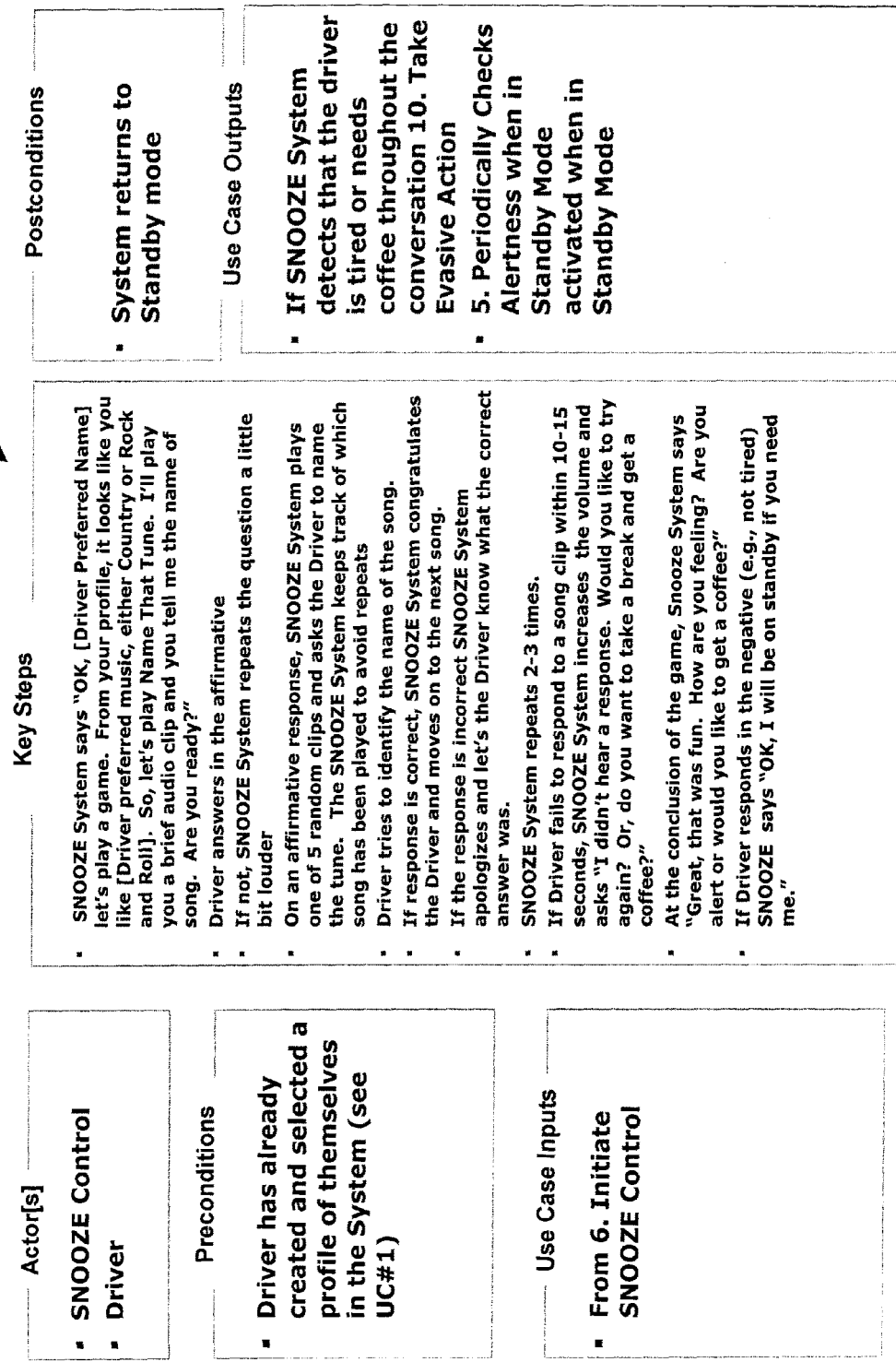

Fig. 13

10. Take Evasive Action

Actor[s]
- SNOOZE Control
- Driver

Preconditions
- Driver has already created and selected a profile of themselves in the System (see UC#1)
- Driver has selected a current trip profile (see UC #2)

Input Use Case
- From 6. Initiate SNOOZE Control
- Or from 7. Engage in Conversation
- Or from 8. Use GPS to Find Nearest Location
- Or from 9. Play Game

Key Steps
- SNOOZE System increases its volume and says "[Driver Preferred Name], I am going to direct you to the nearest exit and rest stop where you can take a break. Please watch the screen and follow the instructions."
- If there is an additional passenger along on the ride who can drive, SNOOZE System adds "I think it would be a good idea to let [Additional Passenger Name] do a bit of the driving right now. Perhaps you should rest and allow [Additional Passenger Name] to take the driver's seat."
- SNOOZE System queries the GPS for the nearest place to get food or pause and displays it on the screen.
- If evasive action is required more than once within a minimum threshold, on the subsequent time:
  - If there is an additional passenger SNOOZE System says "[Driver Preferred Name] I must insist that [Additional Passenger Name] take the wheel."
  - SNOOZE System says "I have the number for [Emergency Contact Name] listed. I will go ahead and contact them"

Postconditions
- SNOOZE set to Standby

Use Case Outputs
- 5. Periodically Checks Alertness when in Standby Mode activated when in Standby Mode

INTERACTIVE FATIGUE MANAGEMENT SYSTEM AND METHOD This invention claims the benefit of priority of U.S. Provisional Patent Application Ser. No. 60/018,722 filed Jan. 3, 2008.

FIELD OF INVENTION

This invention relates to fatigue and drowsy detection systems for drivers, in particular to systems and methods of detecting fatigue and drowsy conditions of vehicle drivers and immediately interacting with the driver as to their condition without initially and immediately setting of disruptive visual/sound alarms to the driver, and instead initially providing information from (LBS) location based services or (POI) points of interest through onboard GPS (global positioning satellite) systems, as well as alerting acquaintances and friends of the driver through telephones such as a cellular phone.

BACKGROUND AND PRIOR ART

A driver's ability to stay awake when drowsy or fatigued is sometimes an impossible task and often dangerous. Once drowsiness and fatigue occurs, a driver can experience impaired reaction time, poor vision and bad judgment. The drowsy and fatigued driver can experience problems with information processing and short term memory. By encountering this level of fatigue or drowsiness, the performance of the driver is reduced and they can experience a lack of motivation. Managing risk is an important factor when driving. The driver generally needs to schedule regular stops every 150 miles or 2 hours. Once fatigued the driver should take a 20 minute nap or consume caffeine the equivalent of 2 cups of coffee. Regardless of the education and warnings about drowsy driving, the deaths continue to rise.

Various ways of managing these risks are through alert systems in the vehicle. Alerts provide warning triggers which are developing the patterns and indicating the on-set of sleep. There are a number of methods and technologies which can determine the on-set of sleep. These vary from visual monitoring of the driver's face, to physiological changes to detecting changes in driving performance. These known systems use various types of biometric analysis from analyzing visual conditions of the drivers head and face to sensing the position of the vehicle relative to the road.

See for example, U.S. Pat. Nos. 5,745,031 to Yamamoto; 7,302,327 to Kudo; 6,370,475 to Breed et al.; 6,426,702 to Young et al.; 6,559,770 to Zoerb; and 6,927,694 to Smith et al.

Once these systems detect a fatigue type condition in the driver's appearance and/or when the vehicle is detected moving off the roadway, alarms sound to alert the driver. The alarms have included sound and/or visual indicators. The warnings can sometime be so startling that the alarm can cause an accident.

The current systems can ding, sound a loud horn, vibrate the seat and even use tightening of the seat belt to let the driver know they are having sleep problems. This harsh alarm approach has not been very effective. The alarms have not caught up with the technology which has been developed for the detection of sleep. Once the reporting of fatigue/sleep is triggered, the approach of awakening or the fore warning given to the driver, has not met the same technology sophistication. The transitory nature of the alarm, its associated lack of interaction and the failure of the alarm to provide useful information regarding how to "manage the current situation", results in the systems being inefficient and under utilized, and often result in the causing of accidents and not avoiding them.

Each year tens of thousands of people are killed on the highways as the direct result of driving in a drowsy or attention compromised condition. Automobile manufacturers are very cognizant of the problem and are investing aggressively in technologies in order to combat the problem and avoid regulation and legal restrictions. To date the focus has been primarily on the detection of unsafe driving performance and to warn the driver. As previously described, these technologies span from camera's embedded in dashboard to watch for drooping eyes to cameras that detect lane departure swerving. These technologies can generally alert the driver of the situation, with the naïve belief that such a warning will be a wake-up call to the driver to either alter their behavior or get off the road. There is unfortunately a fundamental flaw is their logic. While an alarm may provide a temporary warning, it neither alters nor manages the situation. Once the driver has been warned, the same distractions are still available and the fatigue state remains and may return and elevate. While such an alert will temporarily increase the state of alertness and attention of the driver, there is nothing to sustain the state. Considering that the driver is unable to take any immediate action to alleviate the situation, an alarm without a situational management process will prove ineffective with regards to the majority of fatigue situations.

The current fatigue driving alarm systems that are being introduced in consumer automobile currently, suffer from a variety of problems. First is the driver perceived "false positive". Most drivers will not readily admit they are driving in an unsafe condition; rationalizing it was just an isolated momentary event. The sensitivity of the alarm system must be set to detect fatigue early enough for it to be effective from a safety perspective, but this is likely to cause frequent annoying alarming to the driver, even though the driver is in a dangerous situation. Drivers in such a circumstance are likely to turn-off or disable the system, leaving themselves completely unprotected and vulnerable. A safety system that is turned off is not a safety system.

The action of alarming the driver can increase the danger and potential of an accident. This results due to the physiological effects that an alarm has in an irresolvable constrained environment such as an automobile. An unexpected alarm during fatigue causes an immediate surge of adrenaline into the blood stream, reflecting the body's fight or flight response to such stimuli. Since the driver's actions are constrained by the situation, they can't or won't simply pull over and stop the car, they will continue to drive. Now the metabolic pendulum swings in the opposite direction and the body responds by rapidly over compensating from the hormonal stimulation leaving the driver to a potentially lower attention state than before. Unless the driver is able to take immediate action, which under the circumstance is unlikely, the driver will oscillate between the extremes of adrenaline stimulation from the alarm to metabolic crash, with the average performance trend declining rapidly.

Thus, the need exists for solutions to the above problems with the prior art.

SUMMARY OF THE INVENTION

A primary objective of the present invention is to provide systems and methods of detecting fatigue and drowsy conditions of vehicle drivers and immediately interacting information on rest stops, such as food, lodging and fuel stops, to the drivers through onboard GPS (global positioning satellite) systems and LBS (location based services) or POI (points of interest).

A secondary objective of the present invention is to provide systems and methods of detecting fatigue and drowsy conditions of vehicle drivers and immediately interacting visually and audibly with the driver feedback on the driver's condition through an onboard or portable computer system.

A third objective of the present invention is to provide systems and methods of detecting fatigue and drowsy conditions of vehicle drivers and activating a telephone, such as a cellular phone, in the vehicle, to contact friends and acquaintances of the driver.

A fourth objective of the present invention is to provide systems and methods of detecting fatigue and drowsy conditions of vehicle drivers and coaching the driver through conversational companionship with system/method to take the driver out of the snooze-zone temporarily.

A fifth objective of the present invention is to provide systems and methods of detecting fatigue and drowsy conditions of vehicle drivers and asking the driver questions to determine the condition of the driver and to alert the driver of their current condition.

A sixth objective of the present invention is to provide systems and methods of detecting fatigue and drowsy conditions of vehicle drivers that eliminates the need for disruptive alarms, and instead can engage the driver's cognitive mental processes and keep those engaged until the driver can be safely removed from the road.

A seventh objective of the present invention is to provide systems and methods of detecting fatigue and drowsy conditions of vehicle drivers so that cognitive attention of the driver can be raised and maintained at a higher level for a sufficient period of time, to allow the driver to alter the dangerous situation by getting off the road, either for rest, food and coffee or to request other assistance.

An eighth objective of the present invention is to provide systems and methods of detecting fatigue and drowsy conditions of drivers so that cognitive attention of the drivers can be heightened and maintained by "personally" engaging the individual in conversation regarding areas of interest to the individual, as a safety system through Artificial Intelligence.

A preferred embodiment of the novel system and method is to detect fatigue and drowsy conditions of a driver and immediately alert the driver to an awake condition where an onboard GPS system immediately provides directions to the driver the locations of rest stops, such as but not limited to restaurants, lodging, fuel stations, and the like.

Another preferred embodiment of the novel system and method is to detect fatigue and drowsy conditions of a driver, and immediately activate an onboard telephone, such as a cellular phone, which contacts preselected friends and/or relatives of the driver about the fatigue/drowsy condition of the driver.

Another preferred embodiment can allow for a novel system and method of detecting fatigue and drowsy conditions of vehicle drivers, which coaches the driver to respond by voice activation, touch screen or any type of button control assembly on the steering wheel or dash, to follow instructions or to interact. The system can present a numbering system to alert the driver of their level of drowsy driving i.e. one to ten with ten being the number to stop the driver or any combination of numbers. Other types of games can be played with the driver.

The system for coaching drivers under fatigue and drowsy conditions, can include a detector on a vehicle for detecting a fatigue and drowsy condition of a driver, an interactive feedback system for automatically providing feedback to the driver based on questions directed to the driver and answers received from the driver based on the detector detecting the fatigue and the drowsy condition of the driver, a computer for determining location of the vehicle and location of a stop based on the interactive feedback system, the stop selected from at least one of an off ramp, a rest stop, a fuel stop, a food stop and a lodging stop, and an instructional medium for automatically communicating the location of the stops to the driver of the vehicle.

The questions can be based on driver information preprogrammed by the driver. The location detection computer can be a G.P.S. (global positioning satellite) system. The instructional medium can be a screen visible to the driver, and/or an audible voice communication.

The system can have a driver profile record that stores driver name, and an alternative driver name in the computer, so that the questions are based on the driver profile record. The interactive medium can communicate to the driver to allow the alternative driver to take over driving duties from the driver.

A method of coaching drivers operating vehicles under fatigue and drowsy conditions, can include the steps of detecting a fatigue and drowsy condition of a driver, interacting between the computer and driver with prompt questions where responses in order to alert the driver of the fatigue and the drowsy condition, without initially setting off any disruptive visual and sound alarms to the driver, and coaching the driver to a safe use of their vehicle, without setting off the disruptive visual and sound alarms.

The method can include determining location of the vehicle and location of a stop the stop selected from at least one of an off ramp, a rest stop, a fuel stop, a food stop and a lodging stop, by a GPS type system, and communicating the location of the rest stop to the driver of the vehicle.

The systems and methods can periodically check the fatigue and drowsy state of the driver in an automatic setting mode. The systems and methods can also take evasive action by contacting others, and setting off alarms if the fatigue and drowsy conditions of the driver are not corrected.

Further objects and advantages of this invention will be apparent from the following detailed description of the presently preferred embodiments which are illustrated schematically in the accompanying drawings.

BRIEF DESCRIPTION OF THE FIGURES

FIG. 5 is a second step for setting trip profile for the system of FIG. 3.

FIG. 12 is a ninth step of playing an interactive game with the driver of FIG. 3.

FIG. 13 is a tenth step of taking evasive action with the driver of FIG. 3.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The subject invention does not have the problems with automatically setting off highly disruptive alarms, as has been done with basic fatigue detection systems. The key is not to initially provide a momentary alarm but to actively manage the situation. The key to safely managing driver fatigue requires a system that can engage the driver's cognitive mental processes and keep those engaged until the driver can be safely removed from the road. Engaging the driver's cognitive processes requires the application of artificial intelligence technology which is trained to learn and adapt to the unique interests and personality of the driver. The subject invention entitled "Snooze Control" includes a process by which the cognitive attention of the driver can be raised and maintained at a higher level for a sufficient period of time, to allow the driver to alter the dangerous situation by getting off the road, either for rest, food and coffee or to request other assistance. Laboratory studies have shown that cognitive attention can be heightened and maintained by "personally" engaging the individual in conversation regarding areas of interest to the individual. In the case of a lone driver, the key to building a safety system which will manage fatigue is the application of Artificial Intelligence.

The invention, entitled Snooze Control is a conversational artificial intelligence program that can either reside in the automobile's on-board computer or be accessed through a high-speed communications link, either mobile telephony or a wireless internet connection or through a GPS (global position satellite) system. Snooze Control knows about the driver's interests from the initial driver configuration. The system can gather and continue to gather information regarding these interests by periodically connecting to the world-wide-web and digesting relevant content and storing it. As a conversational AI (artificial intelligence) agent, the invention Snooze Control is able to converse intelligently with the driver including up to date information on all the subject matters of interest of the driver. Just as people grow and change, the invention Snooze Control learns about the driver over time and through its frequent conversations with the driver, will expand the list of subjects that the driver is interested in. In addition, the driver can request the invention Snooze Control to retrieve information on any subject and discuss it. As long as Snooze Control has a connection to the (web) internet, it can be able to download and "learn" this new information and engagingly converse with the driver.

Figure 1:
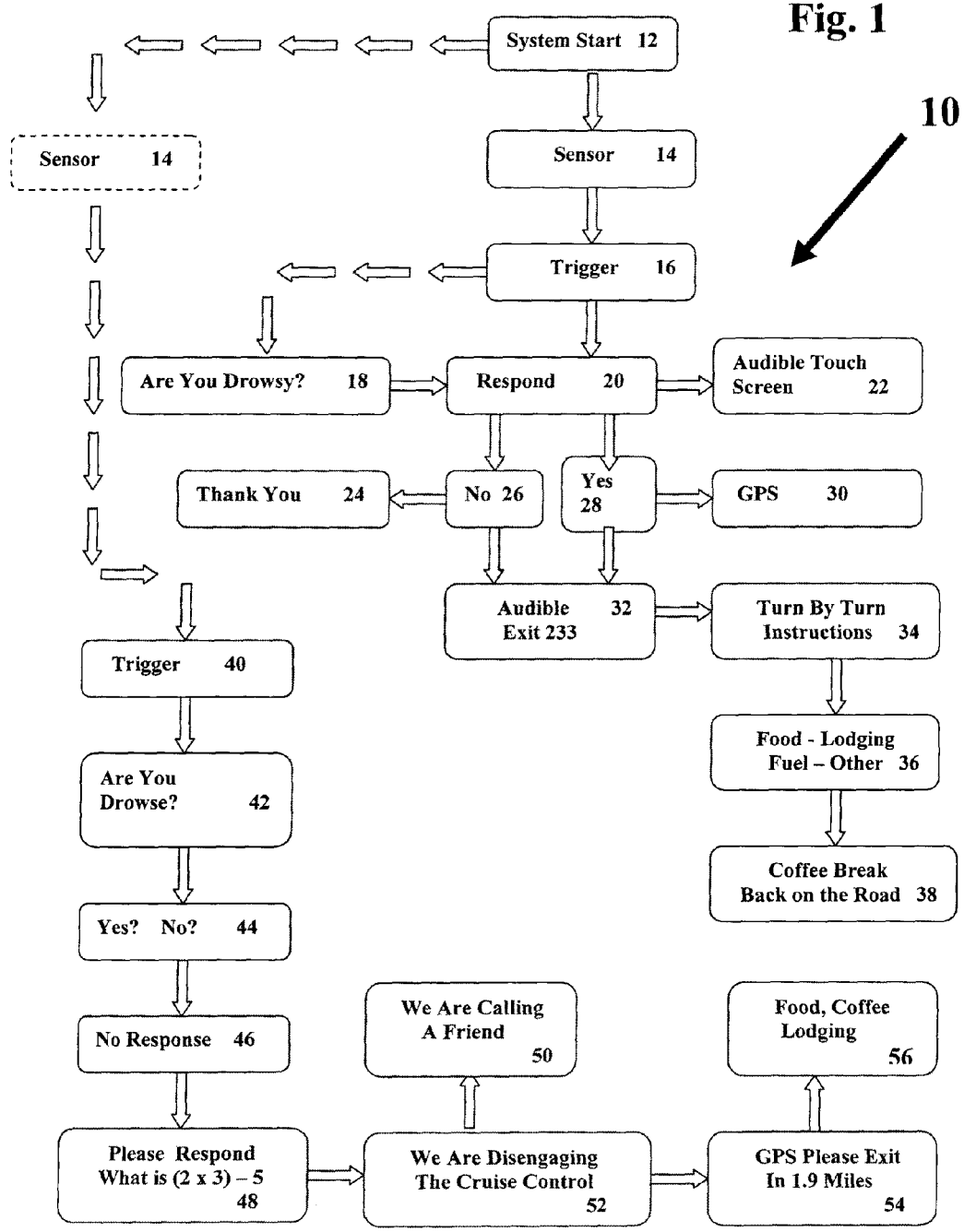
FIG. 1 is a flow chart of the interactive system program steps of the invention.

The invention can have an instructional system program system and method program controlled by the manufacturer. FIG. 1 is a flow chart of the interactive system program steps of the invention.

Referring to FIG. 1, an interactive system 10 can include a system start activation that is automatic when the vehicle is started and/or is manually engaged or pre-programmed by the driver. The system 10 can be part of an onboard vehicle computer system that can monitor driver fatigue or driver alert sensors 14. The sensor(s) 14 can be any type of current system on the market such as but not limited to an eye detection technology, a gaze attention detection technology, a lane departure technology, a drive by wire analysis, and/or a GPS type vector analysis, such as any of those described in U.S. Pat. Nos. 5,745,031 to Yamamoto; 7,302,327 to Kudo; 6,370,475 to Breed et al.; 6,426,702 to Young et al.; 6,559,770 to Zoerb; and 6,927,694 to Smith et al., which are all incorporated by reference.

The novel system 10 can be programmed in the onboard computer to ask questions 18 such as "Are you drowsy?, and/or require the driver to respond 20 to an audible/touch screen 22, where the driver must respond either no 26 or yes 28. The driver responding no 24 can result in the system 24 saying "thank you", and reverting to stand-by mode. If a yes 28 is responded to by the driver, the system 10 can either initiate audible directions such as "take exit 233", and/or pass into the onboard GPS 30 where the driver is given turn by turn instructions 34, which can be followed by specific instructions and locations for food-lodging, fuel, and other pre-programmed destinations 36, after a "coffee break and/or rest stop 38, the system 10 can reboot at 38 back to a monitoring mode.

An other trigger 40 that can be initiated by the sensor 14, can ask questions of the driver 42 such as "Are you drowsy?" and if there is "no response" 46 to the "yes or no" answer 44, the system 10 can ask the driver questions 48 such as "please respond, what is (2×3)−5, and/or any other pre-programmed messages. If the responses are not correct, the system can go into contact others mode 50, and tell the driver "we are calling a friend", followed by additional pre-programmed messages 52 such as "we are disengaging the cruise control" and actually turning off the vehicle cruise control or ask the driver to disengage the cruise control function. Also, the system 10 can activate the onboard GPS and start communicating to the driver directions 54, such as "Please exit in 1.9 miles . . . ", and follow up by giving the driver additional instructions to food, coffee and/or lodging 56.

Figure 2:
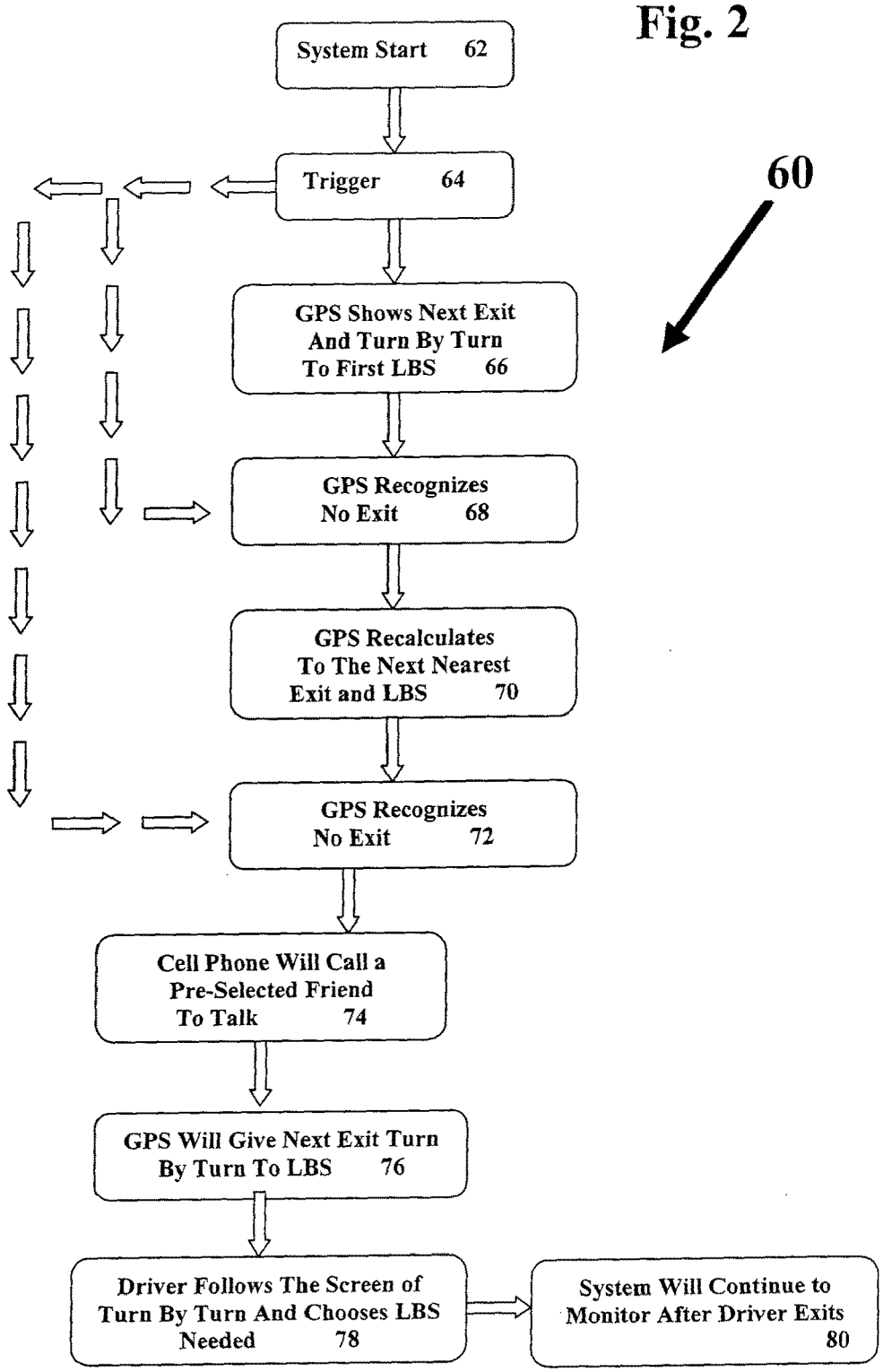
FIG. 2 is a flow chart of the instructional system program controlled by a manufacturer.

FIG. 2 is another flow chart of the instructional system program that connects the system 10 directly to an onboard existing GPS system on a vehicle, such as but not limited to those described in relation to U.S. Pat. Nos. 6,370,475 to Breed et al.; 7,308,247 to Thompson et al.; and 7,426,437 to Breed et al. Once the onboard vehicle computer system 10 is started 62, and the sensor(s) 14 previously described are triggered 64, the system 10 can activate the onboard GPS system to immediately shows the next exit and/or turn by turn to the first LBS (location based services) 66. If the GPS recognizes no exit 68, the GPS recalculates to the nearest exit and LBS 70, if the GPS again recognizes no exit 72, the system can connect an onboard cell phone (or wireless internet connection) to call a preselected number such as a preselected number of a friend to allow the driver to directly talk to that person 74. Next the GPS will give next exit and turn by turn to location based services (LBS) 76, followed by the driver following the screen (on existing onboard GPS of turn by turn and chooses the LBS needed 78, followed by the system 10 will continue to monitor after the driver exits off the road and/or highway 80.

Instead of alerting the driver they might be in trouble, the novel system 10 and method, can speak with the driver and provide helpful and relevant information. A fully interactive version prompts them to listen to and respond to the user by asking questions and giving directions. By being interactive, this will keep the user awake until a destination is met for safety.

The system and method can utilize existing vision system technology or any of the other systems which are used for detecting drowsy driving and fatigue. Once the pattern for the onset of sleep is recognized and trigger points are established, the system and method will intervene. Upon triggering, the system will select information from its dictionary of responses and interaction and optionally combine this communication with information obtained from a GPS on board, off board system or cell phone with GPS.

With the technology available, the automated voice will lead the driver to the nearest exit off the highway to find a safe place to evaluate the drivers' ability to continue.

The interactive system and method can use location based services (LBS) or point of interest (POI) of the GPS to recommend the next available service center. This process is used to get the driver out of the vehicle and prompt him to refuel. This action of moving around will help to awaken the driver. The interactive control can give the person a list of approaching places to eat, have coffee or even recommend a place of lodging.

The driver-vehicle compatibility is very important to improve the chances of getting the driver to respond. This can be for cars, trucks, vessels, trains or pilots. The system and method can interact with a person who is assigned the task of monitoring instruments in a control tower or a nuclear plant.

The process of coaching the driver/controller can prompt the user to interact with the system. Once the system engages the driver to respond, you have taken the driver out of the snooze-zone temporarily. The driver can respond by voice activation, touch screen or any type of button control assembly on the steering wheel or dash, to follow instructions or to interact. The system can present a numbering system to alert the driver of their level of drowsy driving i.e. one to ten with ten being the number to stop the driver.

That same audio, touch screen or steering wheel button, or numbering system can be used to activate the system if the driver recognizes their own fatigue, drowsy driving, and use of drugs or alcohol abuse. A fatigued person or someone driving drowsy may not be recognized by the alert system. The driver may feel uncomfortable about the situation and ask the system to monitor them for safety precautions until they reach the destination.

The process for coaching people can be customized for each manufacturer of the vehicle. With the "action response plan", you can step the driver to the next level. With the software systems provided by the telematics industry, the system can control some of the functions of the vehicle. If an alert is activated for drowsy driving, the system can ask the driver to repeat a request or a simple math problem. Another approach can be; would you like your driver side window lowered? The "action response" for not acknowledging the alert with yes or no would be lowering the window. With the instructional process, the system can prompt the driver to roll down their window for a short period of time. The acknowledgement and prompts will establish a "request response" pattern for the driver to be trained to expect.

Some of the studies on drowsy driving which cause catastrophic accidents and deaths, list a link of having your cruise control on and traveling a highway for a long distance. This can cause a disconnection with the vehicle and you fall asleep without any knowledge of what happened. Day or night time you can use your GPS with LBS or POI to identify driver's choices which will encourage a driver to make the stop. When you do not have any driver-vehicle interaction it can cause complacency. When the alert system detects the impending sleep, the vehicle software system can, according to the manufacturers' ability, reduce the speed of the cruise control. The instructional process can show a picture or display a symbol. According to the customized vehicle selection, it can disengage it when the driver does not respond or send a beep to disengage the cruise control. At this level of fatigue the GPS using (LBS) could find a place for a nap or lodging. It could call a pre-selected friend by cell phone. The system acts like a coach between the vehicle and the driver, by working as a team for safety.

All of these warnings and actions can still take place with an operator assisted program like OnStar by General Motors or any telematics company. The operator will be given updates by computer as the driver responds. These updates leave the operator to work more efficiently with others. If the driver will not follow the planned interaction or the instructional process, a response by the operator can be to call the driver and interact to gauge their ability to continue.

With the rapid growth of the industry and the technology to reduce the different component sizes, the systems for driver alerts and snooze control will follow. For the after market, a down load could be installed into the GPS, LBS/POI or telematics manufacturers' software. By using other forms of installation, could make the system available to drivers who did not have this offered to them at the time of purchase or for older vehicles. Personal Navigation Devices (PND) and cell phones, according to their ability for processing or storage, can be used to act as a device for drowsy driving. By implementing creative ways to position the device on the dash, windshield holder or imbedded into the mirror, will increase the ability to get the technology to the end-user and prevent accidents.

A Columbia University study revealed the startling statistic that approximately 87% of all knowledge received by the brain enters from the eyes. Only approximately 7% of the brain's impressions are received through hearing (or sounds). Using the GPS, which provides you with a screen that gives you a turn by turn direction, makes it easy for the person to follow visually. With the instructional process and the GPS, the same value is added to their ability to remove them from a dangerous situation on the road and lead them to a safe place when the driver is too drowsy to make a decision. When you are not familiar with your surroundings the LBS can find a place to get a cup of coffee or rest. Drowsy driving dose not improve with time.

Just as the GPS is an interactive system for the location based services industry and gives directions, by using any of the driver alert systems and snooze control, a driver can use this interaction or instruction which will be viewed as entertainment and will promote safety and save lives.

The process can be used to interact or the process can be used as an instructional guide which will constantly update the driver and use the GPS to offer alternative choices. The interactive system will use audio to ask for responses and prompt the driver to make decisions. The instructional will step the driver through the process to provide safety.

Figure 3:
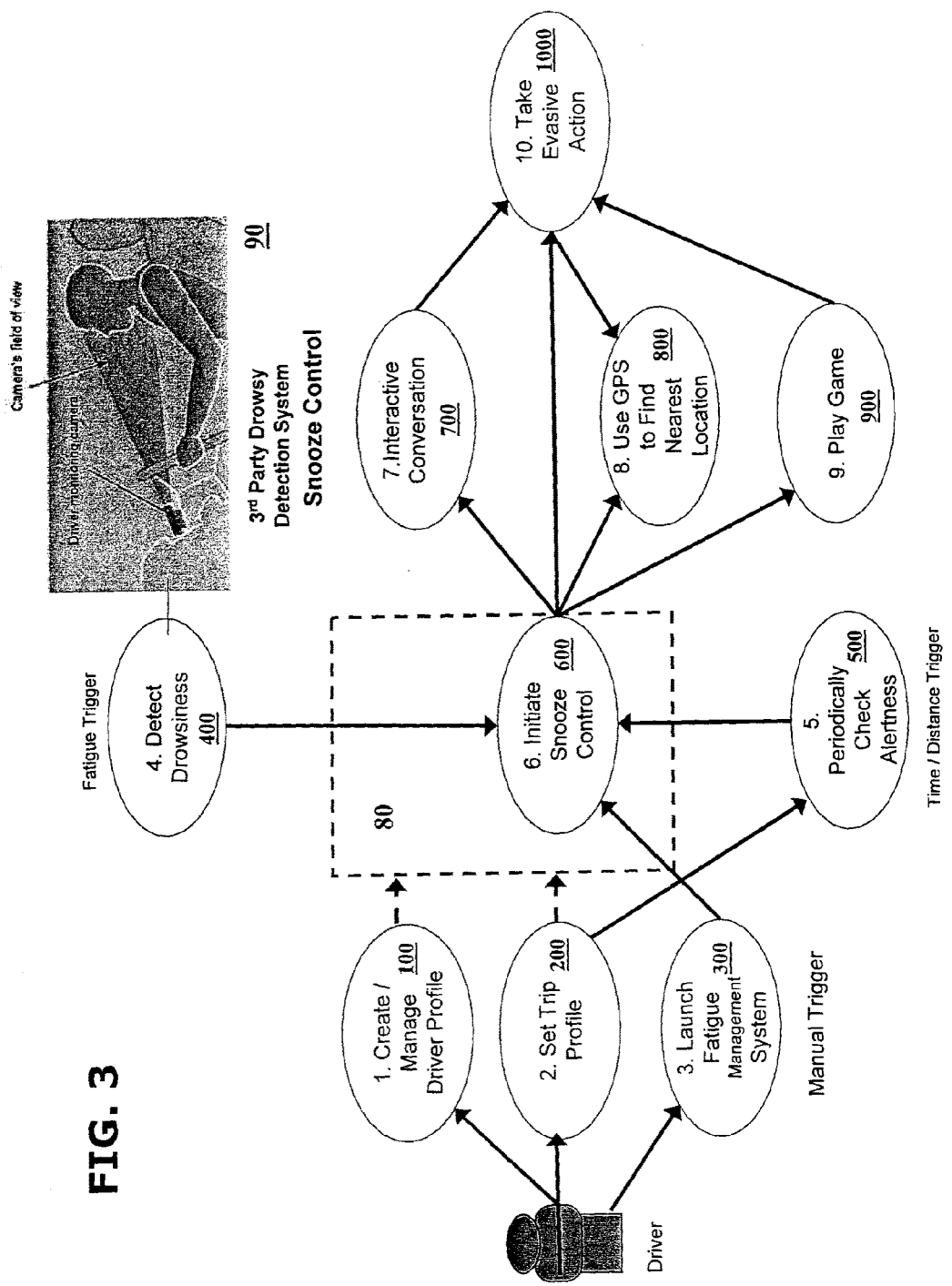
FIG. 3 shows ten (10) steps of a preferred embodiment fatigue monitoring system using a third party drowsy detection system.

FIG. 3 shows the ten (10) steps of a preferred embodiment a monitoring system. A driver can initially create and manage their driver profile 100 (FIG. 4) onto an onboard vehicle computer 80, and follow up by setting a trip profile 200 (FIG. 5) into the onboard computer 80. Next, the driver can launch the fatigue management system 300 (FIG. 6) within the computer 80 as soon as a vehicle trip is started. The onboard computer 80 can have a SNOOZE control software program 600 (FIG. 9) to run the invention.

A third party drowsy detection system 90, such as but not limited to an eye detection technology, a gaze attention detection technology, a lane departure technology, a drive by wire analysis, and/or a GPS type vector analysis, such as those described in U.S. Pat. Nos. 5,745,031 to Yamamoto; 7,302,327 to Kudo; 6,370,475 to Breed et al.; 6,426,702 to Young et al.; 6,559,770 to Zoerb; and 6,927,694 to Smith et al., which are all incorporated by reference. The third party detection system 90 can cause a fatigue trigger 400 (FIG. 7) to detect drowsiness which can then initiate the SNOOZE control program 600 (FIG. 9), which can then engage the driver in conversation 700 (FIG. 10), and/or use GPS to find the nearest location 800 (FIG. 11 such as a rest stop, restaurant, fuel station), and/or play a game 900 (FIG. 12) with the driver. If alternatives 700 (FIG. 10), 800 (FIG. 11) or 900 (FIG. 12) do not result in removing the driver from the fatigue condition, then the system can take evasive action 1000 as shown and described in relation to FIG. 13.

Referring again to FIG. 3, the invention can also periodically check driver alertness 500 (FIG. 8) which can also initiate the SNOOZE control software program 600 (FIG. 9), followed by engaging the driver in conversation 700 (FIG. 10), and/or use GPS to find the nearest location 800 (FIG. 11 such as a rest stop, restaurant, fuel station), and/or play a game 900 (FIG. 12) with the driver. If alternatives 700 (FIG. 10), 800 (FIG. 11) or 900 (FIG. 12) do not result in removing the driver from the fatigue condition, then the system can take evasive action 1000 as shown and described in relation to FIG. 13.

Figure 4:
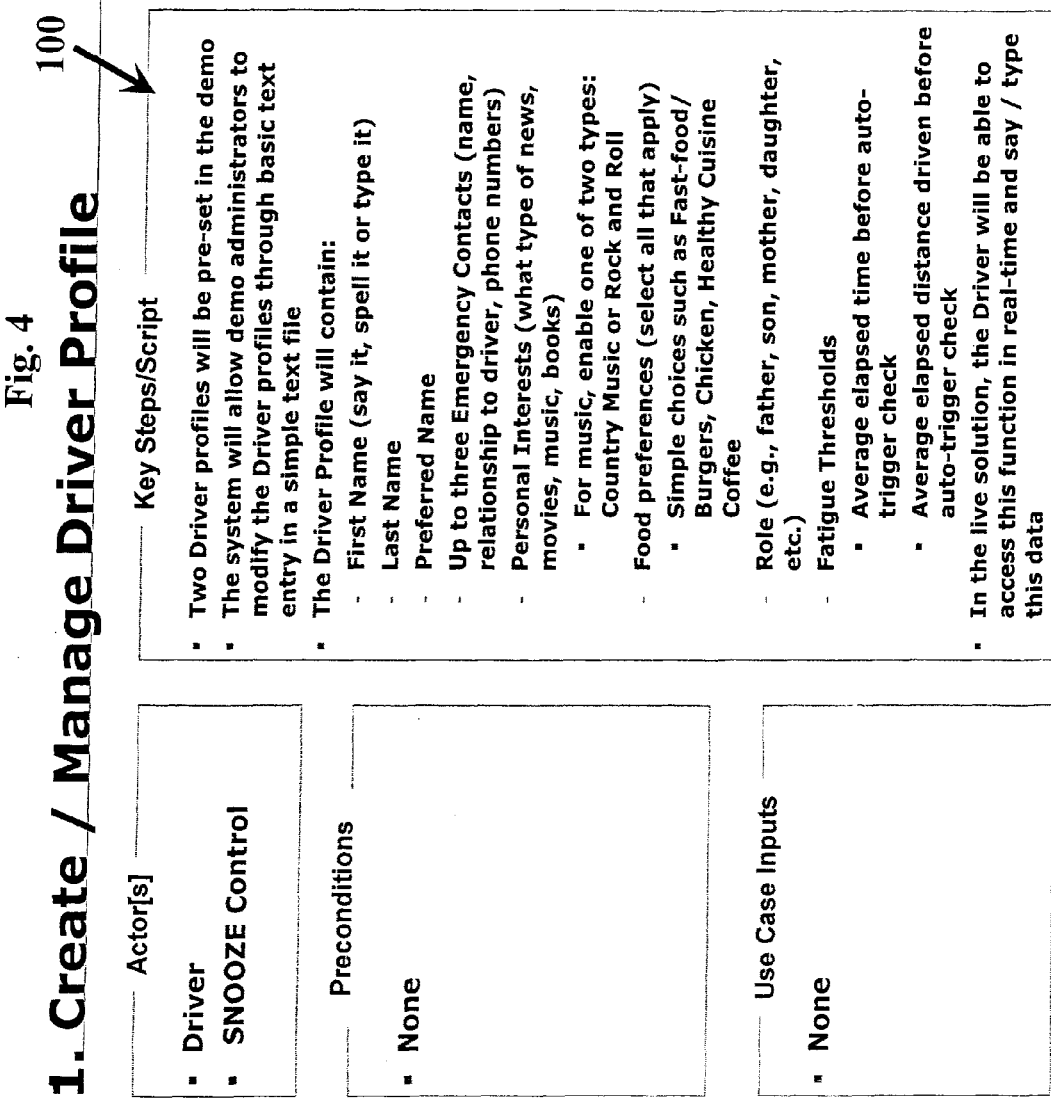
FIG. 4 is a first step for creating and managing driver profile for the system of FIG. 3.

FIG. 4 is a first step 100 for creating and managing driver profile for the system of FIG. 3. The driver can set profiles by text and/or verbal input into the onboard computer. A driver profile can contain, first name, last name, preferred name, up to three emergency contacts (name, relationship to driver, phone numbers), personal interests of driver (what type of news, movies, music, books, food preferences of the driver, the role of the driver (father, mother, son, daughter, and the like), and fatigue threshold settings, such as entering an average elapsed time before an auto-trigger check can occur, and an average elapsed distance driven before an auto-trigger check is done. The driver can pre-input their profiles, and/or update their profiles in real time either by text input and/or verbal input. The system stores each driver profile in memory.

FIG. 5 is a second step 200 for setting trip profile for the system of FIG. 3. Multiple trip profiles can be pre-set by text input and/or verbal input into the vehicle onboard computer. A trip profile can include date, starting location address, planned destination location address, anticipated trip length (long with little stops, short series of trips with frequent stops), trip function (system asks driver for purpose of the trip such as but not limited to vacation, work, visit relative, visit friend, shopping, and the like), names of additional passengers (including first and last names, and preferred name), and basic information about additional passenger (if profile does not exist so that additional passenger can drive vehicle in case main driver becomes fatigued). The system can use the set trip profile to activate step 500 (FIG. 7).

Figure 6:
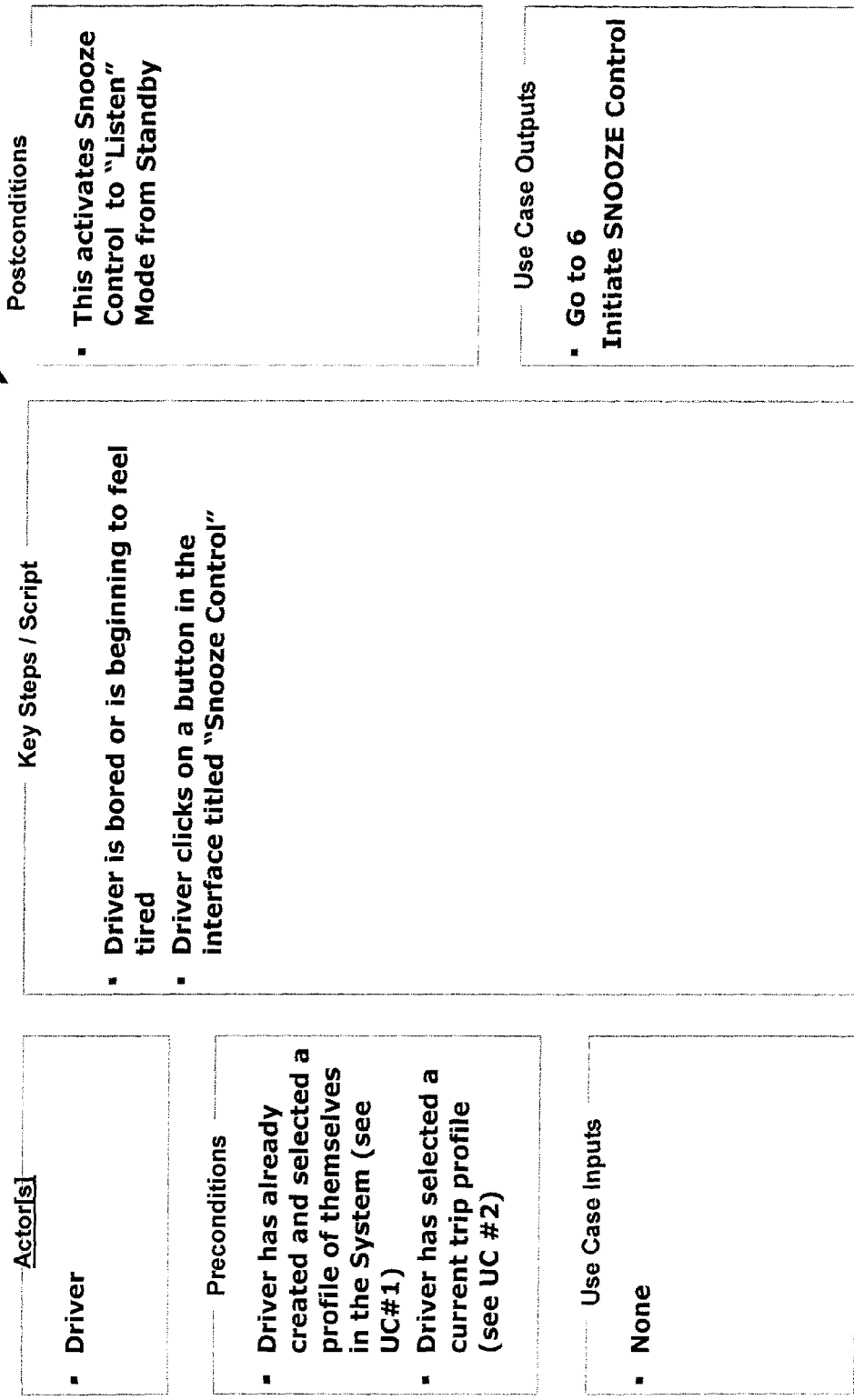
FIG. 6 is a third step for launching the fatigue management system part of the system of FIG. 3.
Figure 8:
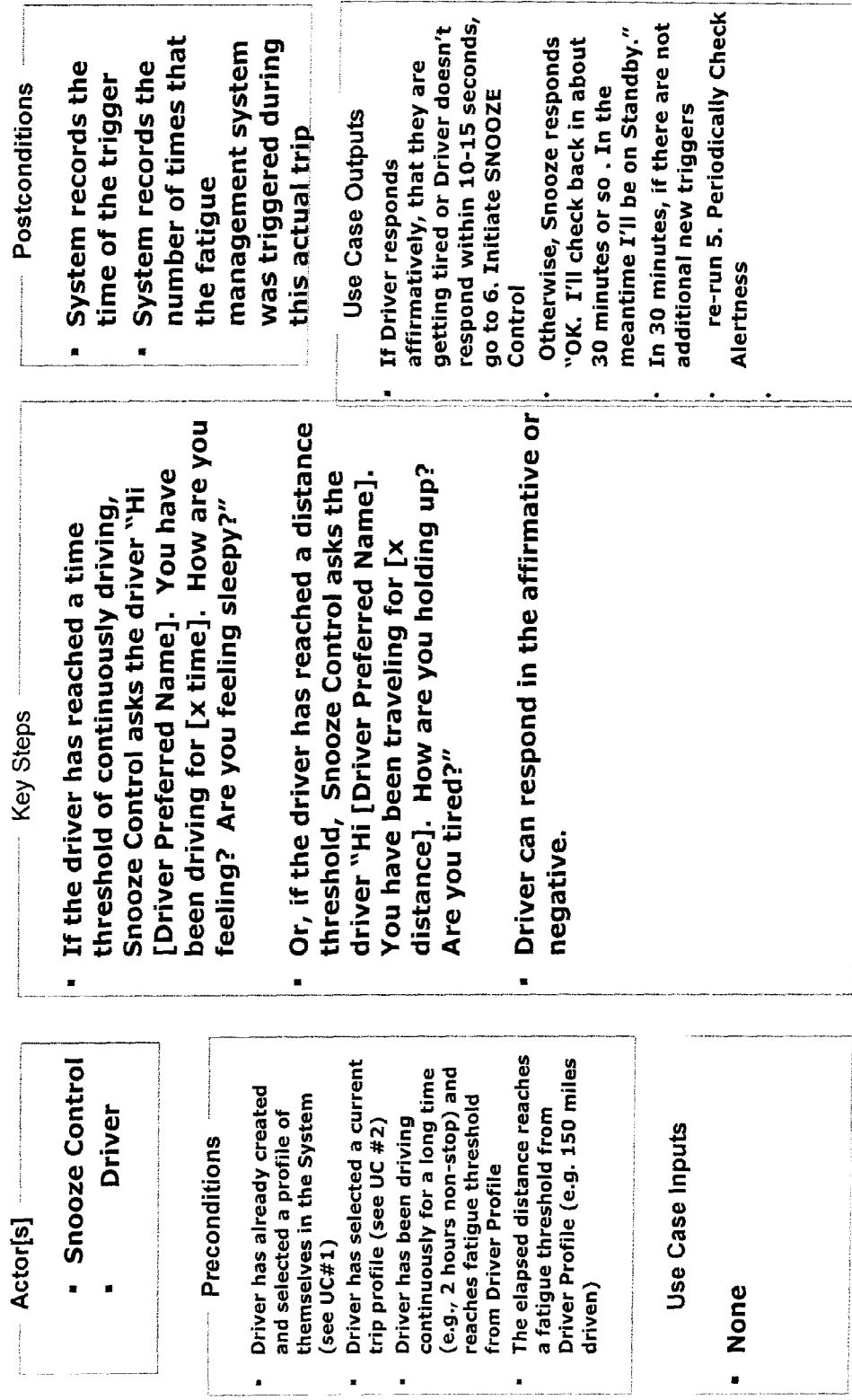
FIG. 8 is a fifth step for periodically checking driver alertness in the system of FIG. 3.

FIG. 6 is a third step 300 for launching the fatigue management system part of the system of FIG. 3. Here, the driver has already created and selected profiles (100 FIG. 4), and selected a trip profile (200 FIG. 5). If the driver is bored or beginning to feel tired, the driver can initiate a snooze control function by manually clicking on a button on dashboard interface, such as one labeled "Snooze Control", which would activate the software program such as a program named EVE™ to be operational to receive inputs from fatigue trigger 400 and third party detection system 90 (FIG. 3) or from the steps of periodically checking driver alertness 500 (FIG. 8). The invention can use an interactive computer program such as the EVE™ Artificial Intelligence system, of Cognitive Code Corporation of Martinsville, N.J., as an interactive computer which can be programmed to engage the driver in real-time. The invention can work with user friendly interactive computers and allow the driver to both input data and have real-time interactions based on sensed conditions. Such interactive computers can include but are not limited to those shown and described in U.S. Published Patent Applications: 2001/0047261 to Kassan; 2002/0178005 to Dusan; 2006/0089754 to Mortenson; and U.S. Pat. No. 6,829,603 to Chai et al., each of which is incorporated by reference.

Figure 7:
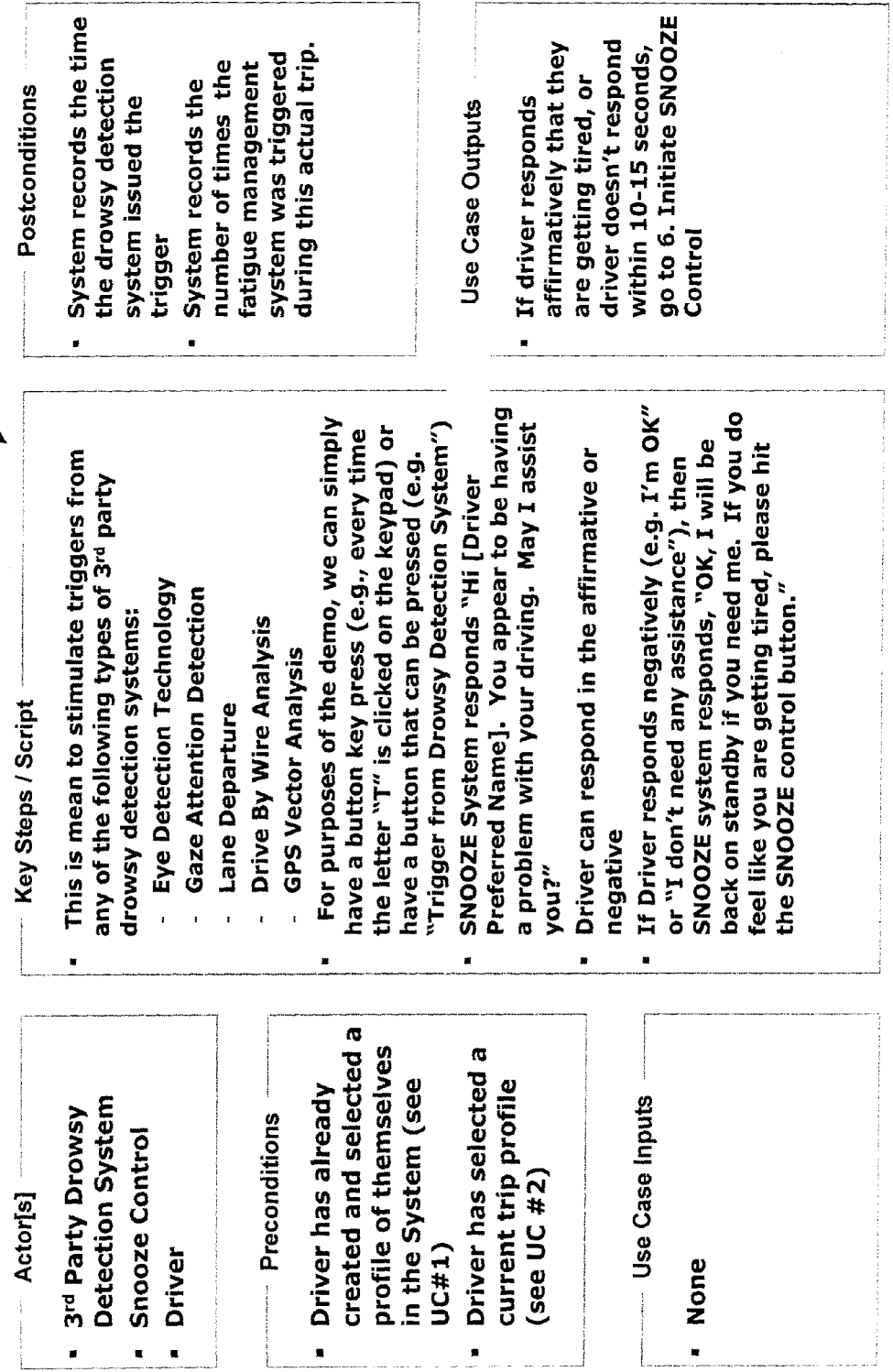
FIG. 7 is a fourth step for detecting drowsiness in the system of FIG. 3.

FIG. 7 is a fourth step 400 for detecting drowsiness in the system of FIG. 3. As previously described, a third party drowsy detection system can be such as but not limited to an eye detection technology, a gaze attention detection technology, a lane departure technology, a drive by wire analysis, and/or a GPS type vector analysis, such as those described in U.S. Pat. Nos. 5,745,031 to Yamamoto; 7,302,327 to Kudo; 6,370,475 to Breed et al.; 6,426,702 to Young et al.; 6,559,770 to Zoerb; and 6,927,694 to Smith et al., which are all incorporated by reference.

Once activated, the SNOOZE control program can ask questions such as "Hi (preferred name of driver). You appear to be having a problem with your driving. May I assist you?" The driver can respond verbal in the affirmative or negative. If the answer is negatively (such as "OK" or "I don't need any assistance" or similar response, the SNOOZE control can respond with "OK . . . I will be back on standby if you need me. If you do feel like you are getting tired, please call my name or hit the SNOOZE control button." If the driver calls the name or clicks the button or the driver does not respond within a preselected time period, such as within approximately 10 to approximately 15 seconds, then the SNOOZE control functions 600 FIG. 9 begins. The invention can record the time that the drowsy detection system issues the trigger, and the system can record the number of times that the fatigue management system was triggered during a selected trip.

FIG. 8 is a fifth step 500 for periodically checking driver alertness in the system of FIG. 3. Periodically checking alertness of the driver is after a driver profile and selected trip profile have been entered, and the driver has been driving for a long time, such as but not limited to 1-2 hours nonstop, and the driver reaches the pre-selected fatigue threshold that was earlier set by the driver, and/or the driver has reached the elapsed distance (such as a preselected distance of 100-250 miles, or 150 miles). Once a time threshold has been reached, the system can ask the driver "Hi (preferred name). You have been driving for (x-time). How are you feeling? Are you feeling sleepy?" Or the system can interact with the driver once a preselected distance (mileage) threshold has been reached and the driver can be questioned asked "How are you holding up? Are you tired?" The driver can respond in the affirmative or negative. If the driver responds in the affirmative they are tired and/or the driver does not respond with a preselected time period such as between approximately 10 to approximately 15 seconds, the system can then initiate the SNOOZE control 600 FIG. 9. Otherwise, if the driver answers no or no problem, the system can respond "OK. I'll check back in about 30 minutes or so. In the meantime I'll be on standby". The system can then go back to a periodical recheck 500 FIG. 8 in the pre-selected time period. Here, the system can record the time of the trigger, and the system can record the number of times the fatigue management system was triggered during the trip.

Figure 9:
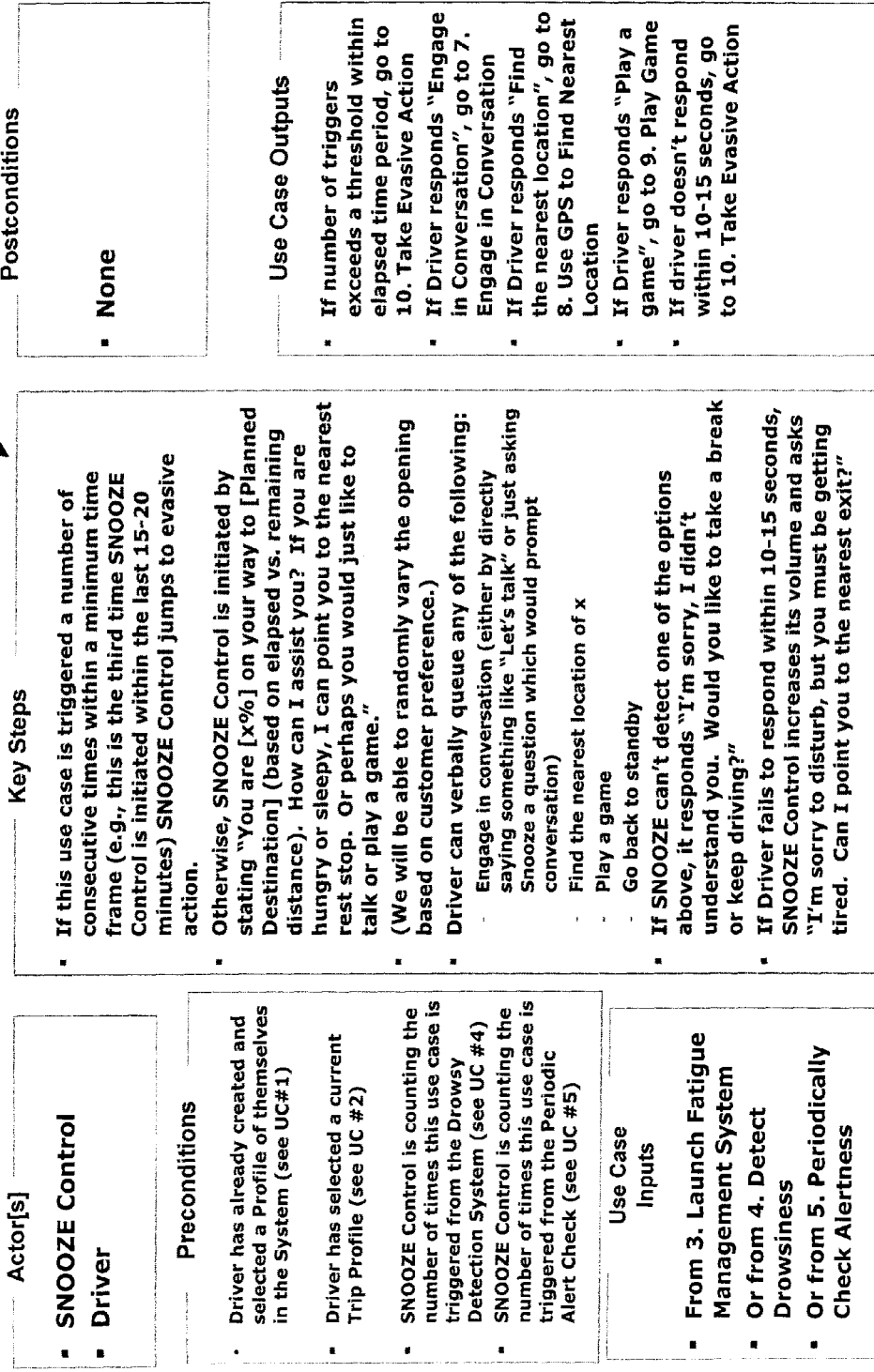
FIG. 9 is a sixth step for initiating a software snooze control program for the system of FIG. 3.

FIG. 9 is a sixth step 600 for initiating the snooze control software program for the system of FIG. 3. The Snooze control can be triggered by the launch fatigue management system 300 FIG. 6 or by the Detect Drowsiness 400 FIG. 7 or by the periodically checking alertness 500 FIG. 8. If the Snooze control was excessively triggered, such as was triggered a third time within the previous approximately 10-20 minutes (preferably within approximately 15 to approximately 20 minutes), the system can jump directly to evasive action 1000 FIG. 13.

The Snooze control can also be initiated based on asking the driver questions such as "You are (X %) on your way to (Planned Destination) (based on elapsed vs. remaining distance). How can I assist you?" The system can also ask questions such as "If you are hungry or sleepy, I can point you to the nearest rest stop." The system can ask the driver "Do you want to play a game?" The Snooze control 600 can pass to 700 Engage in Conversation FIG. 10, or pass to 800 use GPS to find the nearest location FIG. 11, or 900 play game FIG. 12 if any of these topics are requested by the driver. If the system is unable to detect a response the system can repeat the question or turn up the volume on the questions. The system can automatically pass to 1000 take evasive action FIG. 13 if the number of triggers exceeds a threshold within elapsed time period. The system can pass to take evasive action 1000 FIG. 13 is the driver does not respond within a pre-selected time period such as between approximately 10 to approximately 15 seconds.

Figure 10:
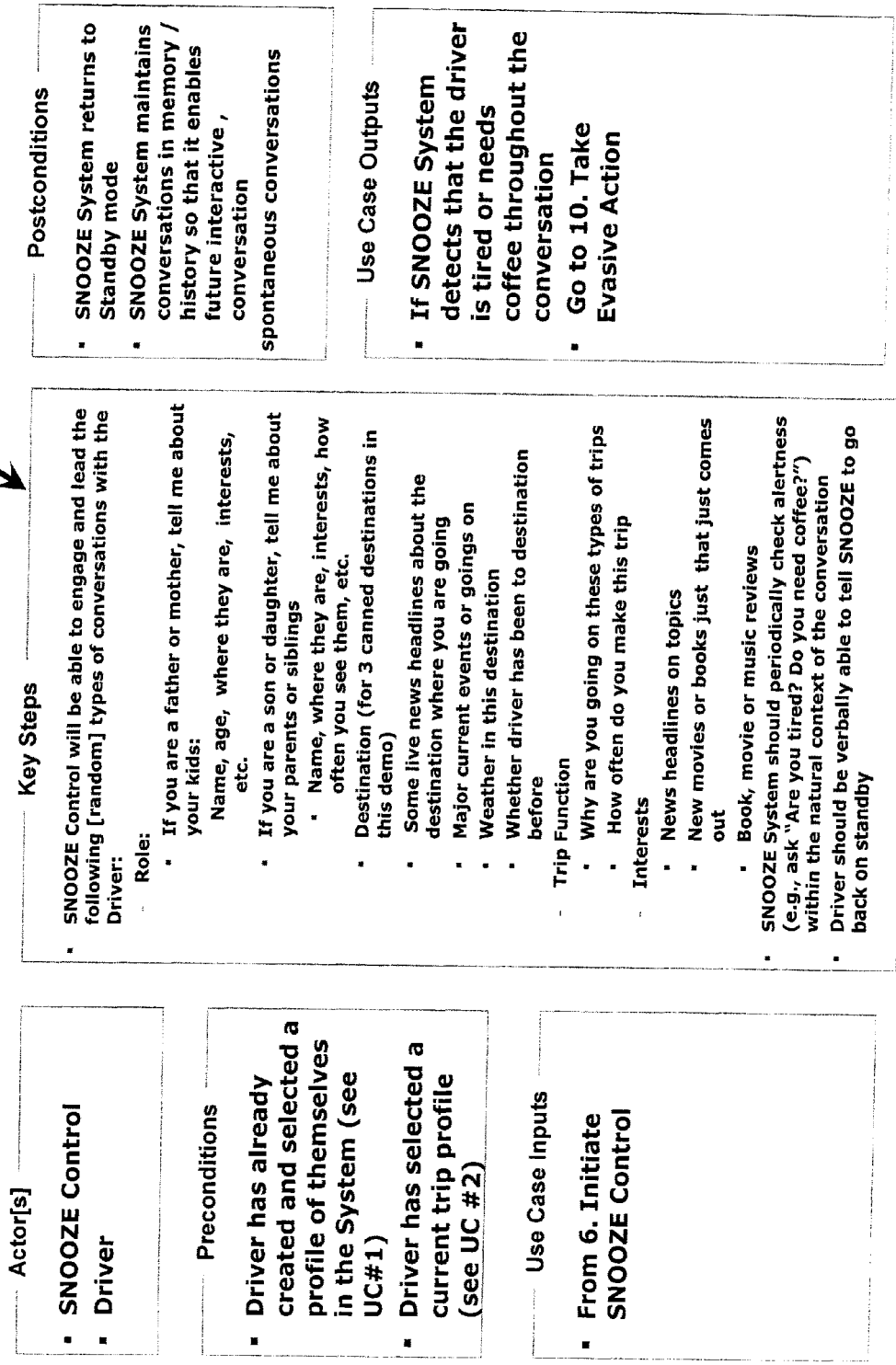
FIG. 10 is a seventh step for engaging a driver in conversation for the system of FIG. 3.

FIG. 10 is a seventh step 700 for engaging a driver in conversation for the system of FIG. 3. Here, the system can have conversations with the driver based on their previously input role, their destination, their trip function, and their interests. The system can also still be running the periodically checking driver alertness 500 FIG. 8. Also, the driver can reboot the system back to standby. If the system detects the driver is tired or needs coffee based on the interactive conversation, the system can pass to take evasive action 1000 FIG. 13.

Figure 11:
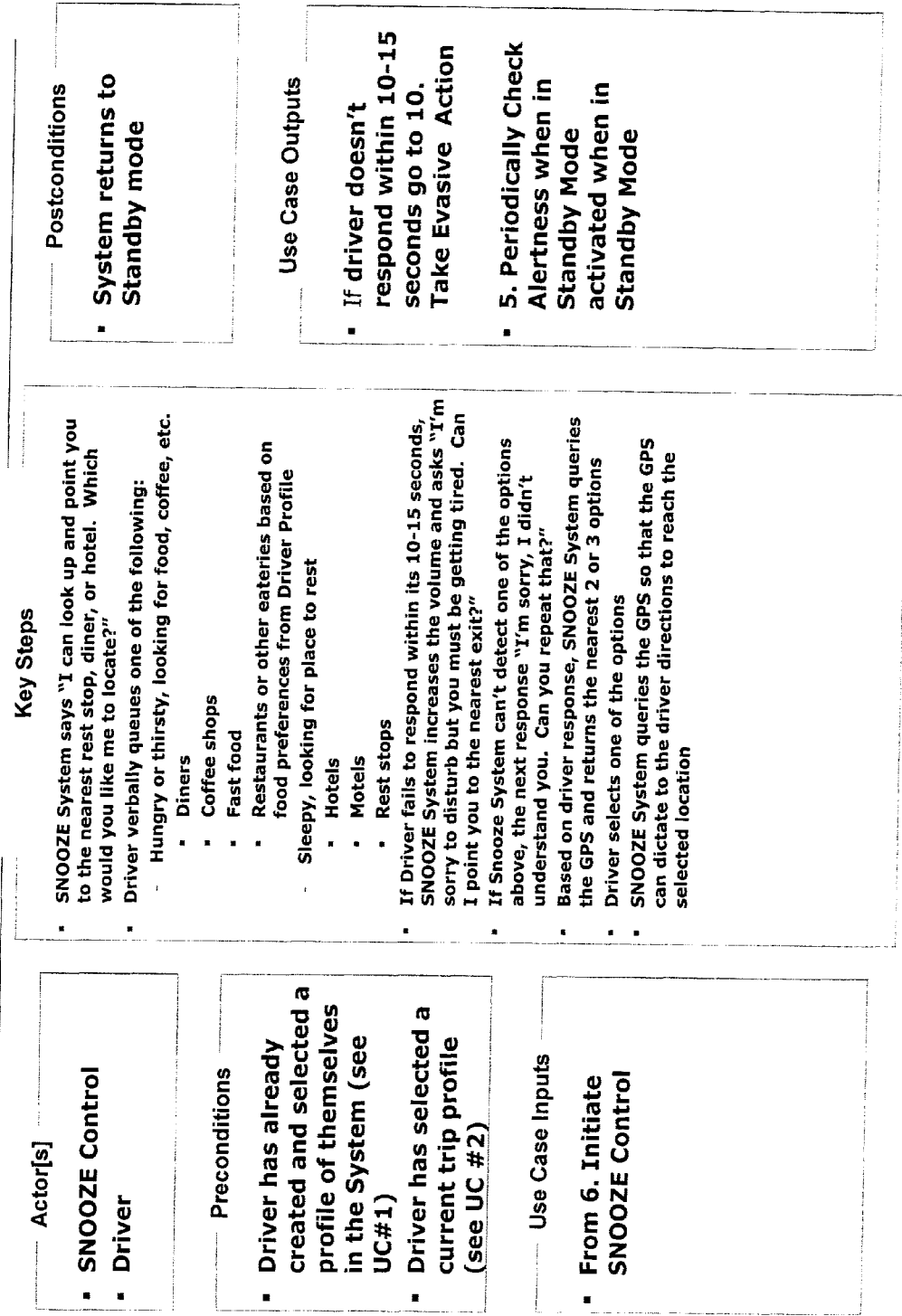
FIG. 11 is an eighth step for using onboard GPS to find the nearest location of FIG. 3.

FIG. 11 is an eighth step 800 for using onboard GPS to find the nearest location of FIG. 3. The system can ask the driver if the driver wants a rest stop, food stop, sleep accommodation, and the like. If the driver positively recites a desired stop or location, the system can return the nearest 2 or 3 options by the onboard GPS system, which can then direct and dictate directions. If the driver does not respond within the pre-selected time (of approximately 10 to approximately 15 seconds), the system can increase the volume of the verbal interaction, and if no response can pass to take evasive action 1000 FIG. 13. The system can also go back to a periodical recheck 500 FIG. 8 in the pre-selected time period. Also, the driver can reboot the system back to standby either verbally or by clicking a button.

FIG. 12 is a ninth step 900 of playing an interactive game with the driver of FIG. 3.

Various types of games can be pre-programmed, such as picking names of songs based on the driver profile inputs, and the like. Similar to the engage in conversation step 700 FIG. 10, the system can go to take evasive action 1000 FIG. 13 if the system determines the driver is tired or needs coffee or no response has come from the driver after a pre-selected time period. The system can also go back to a periodical recheck 500 FIG. 8 in the pre-selected time period. Also, the driver can reboot the system back to standby either verbally or by clicking a button.

FIG. 13 is a tenth step 1000 of taking evasive action with the driver of FIG. 3. Here, evasive action can be triggered from the Snooze control 600 FIG. 9, engage in conversation 700 FIG. 10, use GPS to find nearest location 800 FIG. 11 or play game 900 FIG. 12. The system can increase the volume to the driver, and state proactively "I am going to direct you to the nearest exit and rest stop where you can take a break. Please watch the screen and follow the instructions and directions . . . ."

If there is an additional passenger along on the drive who can drive based on the previously input driver profile, the system can say "I think it would be a good idea to let (additional passenger name) do a bit of driving now . . . . Perhaps you should allow (additional passenger name) to take the driver's seat . . . ." The steps can query the GPS system for the nearest place to get food or rest, and display it on the screen. If evasive action is required more than once within a preselected minimum threshold time, then on the subsequent time, the system can say if there is an additional passenger then "I must insist (additional passenger name) take the wheel . . . ." The system can also be programmed and say "I have preselected phone numbers for [emergency contact name] listed. I will go ahead and contact them . . . " now. Additionally, the system can direct dial a wireless phone (cellular phone) or internet connection to the emergency contact, and/or directly dial authorities (police, and the like) and give the person called the location of the vehicle. The system can also be programmed to disengage a vehicle cruise control. The system can also activate alarms such as sounds including the vehicle horn and/or radio, lights (interior lights, hazard lights, etc), combinations, thereof, and the like. The system can also go back to a periodical recheck 500 FIG. 8 in the pre-selected time period. Also, the driver can reboot the system back to standby either verbally or by clicking a button.

Figure 14:
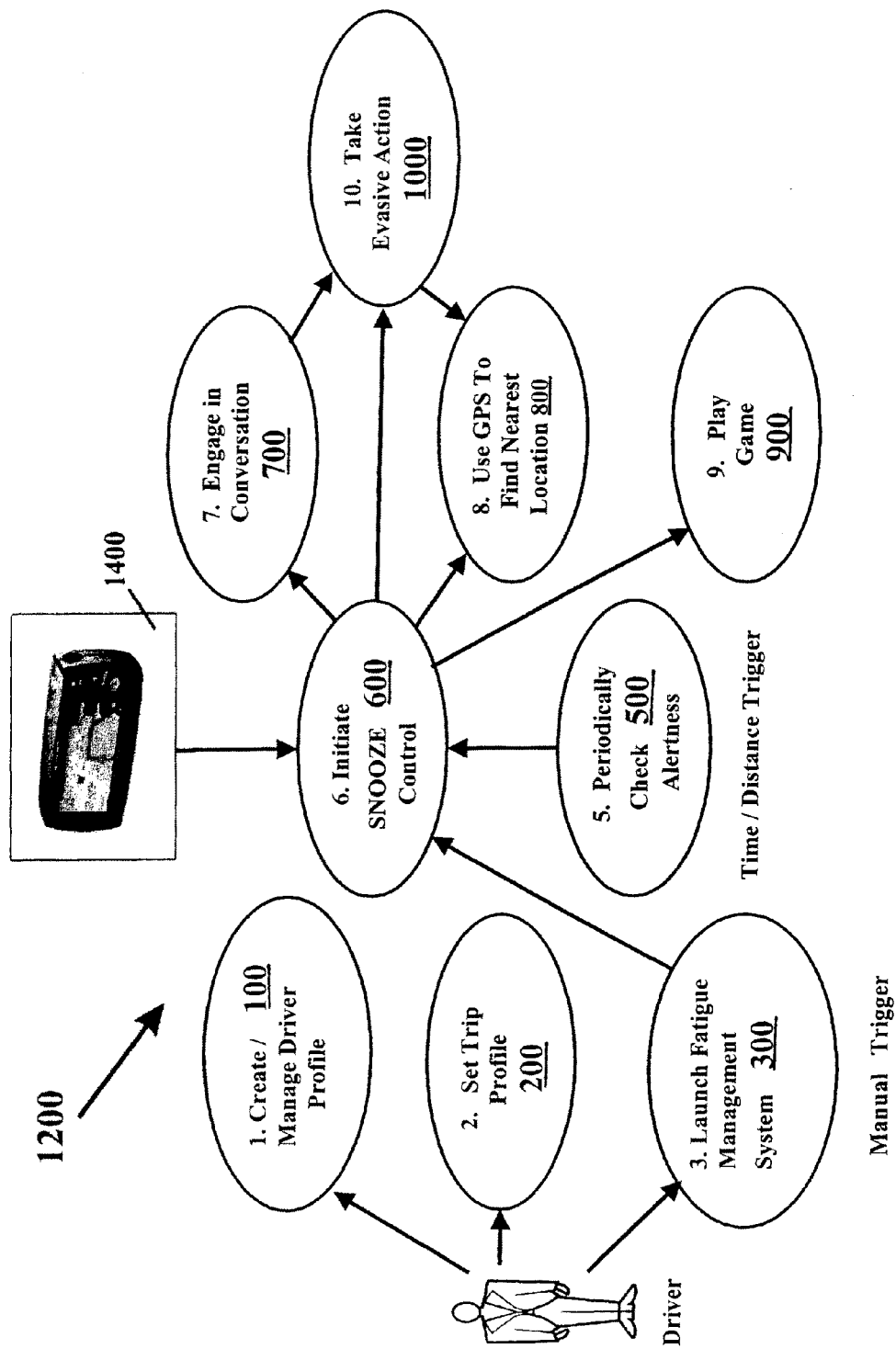
FIG. 14 shows ten (10) steps of another embodiment fatigue monitoring system using a GPS.

FIG. 14 shows ten (10) steps of another embodiment fatigue monitoring system using a GPS (global positioning satellite) services. Here, the ten steps function and interact similar to the steps of FIG. 3, with the exception of using a GPS system 1400 instead of the third party fatigue monitoring system 400. Here, the GPS system can detect location of the vehicle as a trigger to initiate the SNOOZE control 600. The GPS application, entitled Snoozebot can be based on the Fatigue Management platform of Snooze Control. The software system will reside on a GPS Systems or GPS enabled cell phones. These software systems will address the consumer after market as a downloadable program. Unlike Snooze Control which resides on a vehicle's on-board computer system, Snoozebot can be down loaded to a GPS enabled phone or a navigation and communication device which can be portable.

Snoozebot can be comprised of the same components as Snooze Control:
  Artificial Intelligence Brain
  Interface Scripting Engine
  Cognitive Interest Content
  Fatigue Management Methods and Rules The invention can be used in all types of vehicles, such as but not limited to passenger vehicles, vans, pickup trucks, and commercial vehicles such as buses and large trucks, and the like, as well as in other types of vehicles such as airplanes, and the like.

Emergency Driver Profile

As previously mentioned, the telematics industry has created software for vehicles to support and deploy different safety devices. If an accident occurs the telematics will provide air bags and curtain to protect the driver and the occupants. Telematics software can send a signal to notify someone the vehicle has been involved in an accident. Contact is made to determine the driver's needs and support them. They can call an ambulance or a tow truck. This type of service is provided by OnStar™ and other telematics companies.

The invention Snooze Control "Emergency Driver Profile" can be queried, in case of an accident, to give vital life saving information. After the telematics system sends a signal to alert of a vehicle crash, Snooze Control screen can blink off and on to display an emergency sign or medic symbol. The injured driver or an emergency vehicle driver i.e. ambulance or police officer entering the vehicle will have a choice of sending medical history, medication reactions or critical data about a condition they have. This data can be sent to a hospital computer or ambulance computer which is in every emergency vehicle now. The invention Snooze Control, in Emergency Mode will ask upon hearing a voice, if they need the medical information. This critical information can be sent by text to an email, voice data by telephone number or can be repeated to someone who is helping in an emergency situation.

When the driver sets up "Emergency Driver Profile", they can list medications they cannot have. Perhaps they are diabetic and have passed out due to lack of medication and someone needs to know the proper amounts and not take bad data from a confused driver. Snooze Control does not feel stress and can communicate to a helper. The driver can set up an emergency number for someone in case they are passed out, who also knows their medical history. Snooze Control can provide this service for all occupants in the vehicle or a driver who is traveling alone. When accidents happen, Snooze Control can provide a health history which may save the life of the driver when they are involved in an emergency situation.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An interactive system for coaching drivers under fatigue and drowsy conditions, comprising:
    a pre-programmed driver profile record for storing driver information pre-programmed by a driver into a computer, the driver information including: name of the driver, medical history of the driver, emergency contact for the driver, personal interests of the driver;
    an interactive feedback system for automatically providing audio feedback to the driver based on audio questions directed to the driver and audio answers received from the driver;
    wherein the driver profile record further includes: pre-programmed threshold settings between triggering operation of the interactive feedback system, the pre-programmed threshold settings include an average elapsed time between the feedback of questions and answers is initiated between the computer and the driver, once the driver is driving the vehicle;
    a GPS (global positioning satellite) system associated with the computer for determining location of the vehicle and location of a stop based on the interactive feedback system, the stop selected from at least one of an off ramp, a rest stop, a fuel stop, a food stop and a lodging stop; and
    an instructional medium for automatically communicating the location of the stops to the driver of the vehicle.

2. The system of claim 1, wherein the instructional medium includes at least one of:
    a screen visible to the driver, and an audio voice communication to the driver.

3. The system of claim 1, further comprising:
    an alternative driver name stored in the driver profile record, wherein the interactive medium communicates to the driver to allow the alternative driver to take over driving duties from the driver.

4. The system of claim 1, wherein the personal interests stored by the driver is selected from a group that includes: entertainment interests of the driver, food preferences of the driver and role of the driver, the role including at least one of father, mother, son and daughter.

5. The system of claim 1, wherein the emergency contact includes: name and phone number of the contact, and relationship of the contact to the driver.

6. The system of claim 1, further comprising the step of:
    a cell phone for housing the pre-programmed driver profile record, the interactive feedback system, the GPS system and the instructional medium.

7. An interactive system for coaching drivers under fatigue and drowsy conditions to safely remove themselves from driving under the fatigue and the drowsy conditions, comprising:
    a pre-programmed driver profile record for storing driver information pre-programmed by a driver into a computer, the driver information including: name of the driver, medical history of the driver, emergency contact for the driver, personal interests of the driver;
    an interactive feedback system associated with the computer for communicating audio questions with the driver based on the pre-programmed driver profile record which require feedback from the driver as to the fatigue and drowsy condition of the driver, wherein the communicating is without initially setting off disruptive visual or sound alarms to the driver;
    wherein the driver profile record further includes: pre-programmed threshold settings between triggering operation of the interactive feedback system, the pre-programmed threshold settings include an average elapsed time between the feedback of questions and answers is initiated between the computer and the driver, once the driver is driving the vehicle.

8. The interactive system of claim 7, further comprising:
    a GPS (global positioning satellite) system associated with the computer for detecting location of the vehicle and for determining location of rest stops; and
    an instructional communication which communicates by audio the location of the rest stops to the driver of the vehicle.

9. The interactive system of claim 8, wherein the driver profile record further includes:
    an alternative driver name in the computer, wherein the instructional communication communicates to the driver to allow the alternative driver to take over driving duties from the driver.

10. The interactive system of claim 8, wherein the rest stop is selected from the group consisting of an off-ramp, a restaurant, a lodging location, and a fuel station.

11. The system of claim 7, wherein the personal interests stored by the driver is selected from a group that includes: entertainment interests of the driver, food preferences of the driver and role of the driver, the role including at least one of father, mother, son and daughter.

12. The system of claim 7, wherein the emergency contact includes name and phone number of the contact, and relationship of the contact to the driver.

13. The system of claim 7, further comprising:
a cell phone for housing the pre-programmed driver profile record, the interactive feedback system, the GPS system and the instructional medium.

14. A method of coaching drivers operating vehicles under fatigue and drowsy conditions, comprising the steps of:
providing an interactive feedback system with a computer in a vehicle;
storing a pre-programmed driver profile record of driver information into the computer, the driver information including: name of the driver, medical history of the driver, emergency contact for the driver, personal interests of the driver, and pre-programmed threshold settings between triggering operation of the interactive feedback system, the pre-programmed threshold settings include an average elapsed time between the interactive feedback of audio questions and answers is initiated between the computer and the driver, once the driver is driving the vehicle;
interacting between the computer and driver with prompt questions based on the driver information in the pre-programmed driver profile record, where responses determine whether to alert the driver of the fatigue and the drowsy condition, without initially setting off any disruptive visual and sound alarms to the driver; and
coaching the driver to a safe use of their vehicle, without setting off the disruptive visual and sound alarms.

15. The method of claim 14, further comprising the step of:
determining location of the vehicle and location of a stop with a GPS (global positioning satellite) system, the stop selected from at least one of an off ramp, a rest stop, a fuel stop, a food stop and a lodging stop; and
communicating the location of the rest stop to the driver of the vehicle.

16. The method of claim 14, wherein the personal interests stored by the driver is selected from a group that includes: entertainment interests of the driver, food preferences of the driver and role of the driver, the role including at least one of father, mother, son and daughter, and wherein the emergency contact includes: name and phone number of the contact, and relationship of the contact to the driver.

17. The method of claim 14, further comprising the step of:
providing a cell phone for housing the pre-programmed driver profile record, the interactive feedback system, the GPS system and the instructional medium.

* * * * *